United States Patent Office 3,510,350
Patented May 5, 1970

3,510,350
PROCESS FOR CLEANING GEL DEPOSITS FROM POLYMER TRANSFER LINES
James Alexander Priebe, Kingston, Ontario, Canada, assignor, by mesne assignments, to E. I. du Pont de Nemours and Company, Wilmington, Del., a corporation of Delaware
No Drawing. Filed Mar. 28, 1967, Ser. No. 626,707
Claims priority, application Canada, Apr. 6, 1966, 957,497
Int. Cl. B08b 3/00, 9/02; C23g 5/00
U.S. Cl. 134—22                                5 Claims

ABSTRACT OF THE DISCLOSURE

A process for cleaning polymer transfer pipelines and, in particular, removing deposits of degraded polymer from the interior walls of the pipelines without the need for dismantling the pipelines. Steam reacts with the degraded polymer to remove it from the walls of the line.

BACKGROUND OF THE INVENTION

This invention relates to methods of cleaning pipelines, and, more particularly, to methods for removing gel deposits from polymer transfer pipelines.

In the manufacture of polyamide and polyester yarns, molten polymer is conveyed to spinning block assemblies through jacketed transfer pipelines. The molten polymer conveyed in these lines is kept at a high temperature and high pressure to ensure that it is in the correct molten condition when it reaches the spinneret.

In some polymers a certain amount of degrading is continually occurring, and small amounts of high viscosity polymer are formed. This high viscosity polymer collects in the stagnant and slower moving areas of the transfer line and forms "gel." Gel consists of degraded polymer in which cross-linking has presumably taken place in the polymer molecules. The gel bonds on transfer line walls in stagnant areas and curves until eventually the polymer flow is restricted. Some particles of gel break away from the walls and are carried by the polymer stream to the spinning block assemblies. Their accumulation in the assemblies leads to interruptions of spinning continuity, causing breaks and other defects in the yarn issuing from the spinneret.

When the flow in a transfer line is restricted to such a point that it affects the spinning process by gel accumulation on the walls of the line or in the spinning block assemblies, it is necessary to shut off the polymer flow and clean out the transfer lines. In the past, this cleaning has been done by dismantling all the transfer pipelines and transporting them to a furnace where the polymer is burnt out. This is a costly and time-consuming operation and results in a shut down from two days to three weeks.

SUMMARY OF THE INVENTION

An object of this invention is to provide a new and improved process for cleaning polymer transfer pipelines.

Another object of this invention is to provide a new and improved process for removing deposits of degraded hydrolyzable polymer from the interior walls of polymer transfer pipelines.

These objects are accomplished in a process of cleaning a heated transfer line for a hydrolyzable polymer which tends to form gel on the wall of the line when in the molten condition by first reducing the flow of polymer in the line, then admitting steam to the line to mix with the reduced flow of polymer and flushing the resultant low viscosity mixture from the line by means of the applied steam. Following this, the polymer flow to the line is stopped, and flushing continues until most of the low viscosity mixture is flushed from the line. Pressurized steam is maintained in the line and the steam is heated by maintaining normal temperature on the line for a sufficient period of time to hydrolyze a portion of gel within the line and to free another portion in the form of particles. Finally, the combination of hydrolyzed gel and particles of solid gel broken away during hydrolysis are blown from the line with high pressure steam.

In normal operation a hydrolyzable thermoplastic polymer such as a polyamide enters the transfer line from a supply point under high pressure and at a temperature above the melting point of the polymer but not so far above that too much degrading occurs. The transfer line is jacketed and is heated by a vapor heat supply, usually Dowtherm (registered trademark) (the eutectic mixture of diphenyl and diphenyl oxide) to keep the polymer in a molten state. After the transfer line, the polymer comes to a manifold system where the flow is split up and routed to a number of spinning blocks. At each spinning block is a meter pump, pack, and spinneret where the yarn is finally extruded.

In the design of transfer line and manifold systems, every attempt has been made to eliminate gel formation of polymers by avoidance of dead spots or blind ends. Stagnant areas and elbows where slowing of the flow occurs are minimized. Flow inverters of the kind described by Boucher et al. in U.S. Pat. No. 3,128,794 are installed to direct polymer flowing at the outside of the stream to the center. These attempts, however, only postpone the formation of gel against the inside surface of the pipe for a period of time after which gel forms despite these precautions.

It has been found that the formation of gel in heated transfer lines for molten polyhexamethylene adipamide is dependent upon age. The table below shows the various stages of degradation for 6-6 nylon and the times in which they form in a transfer line at normal operating temperatures and pressure.

The expression "relative viscosity" (RV) as used herein signifies the ratio of the flow time in a viscometer of a polymer solution containing 8.2%±0.2% by weight of polymer in a solvent, relative to the flow time of the solvent by itself. Measurements of relative viscosities were made with 5.5 g. of polyamide in 50 ml. of 90% formic acid at 25° C.

TABLE

| Type | Age | Description | Remarks |
| --- | --- | --- | --- |
| New polymer | Under 24 hrs | White liquid | Low viscosity (40-60 RV). |
| Old polymer | 24 to 48 hrs | do | High viscosity (over 80 RV), small amount of degradation occurs. |
| New gel | Over 48 hrs | White solid | Causes severe yarn problems, easily removable by hydrolysis. |
| Old gel | Over 3 weeks | Black solid | Removable under severe stress, breaks off walls and conveyed away in lumps by steam-polymer stream. |
| Inert gel | 2 to 3 months | Translucent solid. | Very difficult to remove except by burning in furnace. |

In the cleaning operation for nylon transfer systems the spinnerets and packs are removed from the spinning blocks and the polymer throughput is reduced to about 10–15% of normal. Steam at 200 p.s.i. and at a temperature of approximately 195° C. is fed into the system at the supply end and mixed with the new and old polymer in the transfer line by the turbulent motion of the steam in the pipe. This mixing action is accentuated by the flow of the steam-polymer mixture through the previously referred to flow inverters. It has been found that when the steam contacts the polymer, hydrolysis occurs and the viscosity of the polymer is reduced from an order of magnitude noted above for "New Polymer" to a relative viscosity of about 15. This steam-polymer mixture is flushed by the pressurized steam through the meter pumps and allowed to discharge to waste. When all the polymer that can easily be removed by this step is out of the line, the polymer supply to the line is shut down and blanked off. Steam at about 250 p.s.i. and a temperature of approximately 208° C. is fed into the supply end of the system and allowed to flow through the line from 1 to 10 hours, depending on the size of the transfer lines and the amount of gel to be removed. The Dowtherm jacket temperature is maintained constant at 290° C. During this time, the steam is heated and hydrolysis occurs between the steam and the old polymer and new gel in the lines. The new gel liquefies and the viscosity of the polymer is greatly reduced. Little hydrolysis occurs between the steam and the old gel, but as the new gel is liquefying it is found that most of the old gel breaks off the inside walls of the transfer lines in the form of particles. The pressurized steam continually flushes the line, and the combination of hydrolyzed gel and particles of old gel is blown from the line to a waste receptacle. When no further polymeric residue is observed coming from the line, the system is sufficiently clean for startup with new polymer.

No flow control for the steam is necessary in the first and last stages of this process; however, it has been found that the process is more effective when, during the last stage of the process, the pressurized steam is allowed to flow freely from the line, then bled from the line for a period of time, and finally allowed to flow freely from the line. The bleeding is accomplished by valving off all but one of the spinning blocks being fed by the transfer line.

This process has very little effect on inert gel left in the transfer line, and it becomes practically a part of the pipe. It will not break off and affect the yarn issuing from the spinneret. When the buildup of inert gel becomes such that the polymer flow is affected, it is necessary to dismantle the pipes and burn out the deposit in a furnace.

In one run involving a jacketed polymer transfer pipeline heated by Dowtherm and supplying molten 6–6 nylon to eight spinning units, a power failure occurred which had shut down the polymer supply unit. When the unit was restarted, the manifold pressure could not be raised above 100 p.s.i., although the supply unit discharge pressure was 1300 p.s.i. The manifold pressure before the shutdown was 300 p.s.i.

After operating for approximately one hour with the manifold pressure remaining close to 100 p.s.i., it became evident that the pluggage could not be pumped free. The supply unit was shut down, the spinnerets and packs were removed, and the unit was pumped as free of polymer as possible. The feed opening to the supply unit was blanked off, and 250 p.s.i. steam at approximately 208° C. was applied to the supply unit for three hours. The flushing steam passed through the transfer line, manifold system, and meter pumps, following the normal course of the polymer. Dowtherm temperature was maintained at 290° C. on the transfer line jacket.

After normal operations were resumed, the manifold pressure increased to 350 p.s.i., and the supply unit discharge pressure dropped to 1200 p.s.i.

Following another run, two transfer lines supplying spinning units with molten 6–6 nylon were prepared for cleaning by removing the spinnerets and packs, shutting down the supply units, and pumping the lines as free of polymer as possible. The feed openings to the supply units were blanked off and steam at 200 p.s.i. was passed through the transfer line, manifold system and meter pumps for 4 hours. Finally, the system was blown through with high pressure steam at 250 p.s.i. and a combination of hydrolyzed gel and particles of solid gel was discharged to the atmosphere.

The transfer lines were then disassembled and inspected and found to be very clean. There was $\frac{1}{32}$ of an inch layer of inert gel in the transfer line sections nearest to the supply unit. It was felt that any gel not removed during this cleaning operation is so inert and strongly bonded to the pipe wall that it would not affect polymer quality during processing.

Although the specific descriptions relate to jacketed transfer lines heated with Dowtherm for polyhexamethylene adipamide (6–6 nylon), it is apparent that the process of this invention is also applicable to any other gel susceptible, thermoplastic polymer. Another typical nylon is polyhexamethylene sebacamide. A typical polyester is polyethylene terephthalate. Other means of heating the line may also be employed such as electrically heated wrappings around the line. It is equally apparent that other changes, modifications, and adaptations of the disclosed process may be accomplished without departing from the spirit of the present invention which is, therefore, intended to be limited only by the scope of the appended claims.

What is claimed is:

1. A process of removing gel deposits from a heated transfer line for a hydrolyzable polymer which tends to gel on the interior walls of the line when flowing through the line in a molten condition, said process comprising:
    (a) reducing the polymer flow to about 10–15% of the normal flow;
    (b) admitting steam to the line to mix with the reduced flow of polymer and to hydrolyze the polymer, thereby lowering the viscosity thereof;
    (c) stopping the polymer flow to the line;
    (d) flushing all of the low viscosity polymer from the line with steam;
    (e) maintaining pressurized steam flow in the line to keep the line filled with steam;
    (f) heating the steam in the line from 1 to 10 hours by means of the heated line so that the steam reacts with the gel to hydrolyze a portion and break off particles of another portion thereof; and
    (g) blowing the combination of hydrolyzed gel and particles of gel from the line with high pressure steam.

2. The process of claim 1 wherein the polymer is a polyamide.

3. The process of claim 1 wherein the polymer is a polyester.

4. The process of claim 1 wherein the polymer consists essentially of polyhexamethylene adipamide.

5. The process of claim 1 wherein the polymer consists essentially of polyethylene terephthalate.

References Cited

UNITED STATES PATENTS

| | | | |
|---|---|---|---|
| 1,603,541 | 10/1926 | Huff | 134—22 |
| 1,698,493 | 1/1929 | Dressler | 134—39 |

(Other references on following page)

References Cited

UNITED STATES PATENTS

| | | | |
|---|---|---|---|
| 1,939,112 | 12/1933 | Eulberg | 134—20 |
| 2,289,351 | 7/1942 | Dixon et al. | 134—30 XR |
| 2,563,085 | 8/1951 | Utsinger | 134—22 XR |
| 2,669,531 | 2/1954 | Petkus | 134—22 XR |
| 2,779,696 | 1/1957 | Rutherford | 134—22 XR |
| 2,907,687 | 10/1959 | Scigliano | 134—22 XR |
| 2,917,418 | 12/1959 | Cathcart | 134—30 XR |
| 2,951,777 | 9/1960 | Zimmerman | 134—42 |
| 3,022,161 | 2/1962 | Finkener et al. | 134—38 |

MORRIS O. WOLK, Primary Examiner

J. T. ZATARGA, Assistant Examiner

U.S. Cl. X.R.

134—2, 5